(12) United States Patent
Abdel-Reheem et al.

(10) Patent No.: US 9,971,763 B2
(45) Date of Patent: May 15, 2018

(54) NAMED ENTITY RECOGNITION

(71) Applicant: Microsoft Technology Licensing, LLC, Redmond, WA (US)

(72) Inventors: Eslam Kamal Abdel-Aal Abdel-Reheem, Cairo (EG); Mohamed Farouk Abdel-Hady, Cairo (EG); Ahmed Said Morsy, Burnaby (CA); Abubakrelsedik Alsebai Karali, Cairo (EG); Michel Naim Naguib Gerguis, Cairo (EG); Achraf Abdel Moneim Tawfik Chalabi, Cairo (EG); Rania Ibrahim, Cairo (EG); Nematallah Ali Mahmoud Saleh, Cairo (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 14/248,113

(22) Filed: Apr. 8, 2014

(65) Prior Publication Data
US 2015/0286629 A1    Oct. 8, 2015

(51) Int. Cl.
*G06F 17/27* (2006.01)
*G06F 17/28* (2006.01)

(52) U.S. Cl.
CPC ........ *G06F 17/278* (2013.01); *G06F 17/2827* (2013.01)

(58) Field of Classification Search
CPC .................................................. G06F 17/278
(Continued)

(56) References Cited

U.S. PATENT DOCUMENTS 6,122,647 A * 9/2000 Horowitz .......... G06F 17/30873
707/999.003
6,529,910 B1 * 3/2003 Fleskes ............... G06F 17/3089
707/770
(Continued)

OTHER PUBLICATIONS

G. Attardi et al, in "Automatic Web Page Categorization by Link and Context Analysis", Proceedings of 1 st European Symposium on Telematics, Hypermedia and Artificial Intelligence, 1999.*
(Continued)

*Primary Examiner* — Jakieda Jackson
(74) *Attorney, Agent, or Firm* — Schwegman Lundberg & Woessner, P.A.

(57) ABSTRACT

Named entity recognition is described, for example, to detect an instance of a named entity in a web page and classify the named entity as being an organization or other predefined class. In various examples, named entity recognition results are used to augment text from which the named entity was recognized; the augmentation may comprise information retrieval results about the named entity mention. In various embodiments, labeled training sentences in many different languages and for many different classes, are obtained to train machine learning components of a multi-lingual, multi-class, named entity recognition system. In examples, labeled training sentences are obtained from at least two sources, a first source using a multi-lingual or monolingual corpus of inter-linked documents and a second source using machine translation training data. In examples, labeled training sentences from the two sources are selectively sampled for training the named entity recognition system.

18 Claims, 12 Drawing Sheets

(58) Field of Classification Search
USPC .................................................. 704/8, 9, 4, 2
See application file for complete search history.

(56) References Cited

U.S. PATENT DOCUMENTS

| | | | |
|---|---|---|---|
| 8,438,009 B2 | 5/2013 | Amini et al. | |
| 8,521,507 B2 | 8/2013 | Shi et al. | |
| 2006/0026496 A1* | 2/2006 | Joshi | G06F 17/30896 715/205 |
| 2007/0156392 A1 | 7/2007 | Balchandran et al. | |
| 2008/0102911 A1* | 5/2008 | Campbell | G06F 17/30867 463/9 |
| 2010/0114899 A1* | 5/2010 | Guha | G06F 17/30867 707/741 |
| 2014/0163951 A1* | 6/2014 | Nikoulina | G06F 17/2809 704/4 |

OTHER PUBLICATIONS

Richman, et al., "Mining Wiki Resources for Multilingual Named Entity Recognition", In Proceeding of the Annual Meeting of the Association of Computational Linguistics, Jun. 15, 2008, 9 pages.
Stefan Munteanu, et al., "Improving Machine Translation Performance by Exploiting Non-Parallel Corpora", In Journal of Computational Linguistics, vol. 31, Issue 4, Dec. 2005, 28 pages.
Adar, et al., "Information Arbitrage across Multi-lingual Wikipedia", In Proceedings of 2nd ACM International Conference on Web Search and Data Mining, Feb. 9, 2009, 10 pages.
Nothman, et al., "AnalysingWikipedia and Gold-Standard Corpora for NER Training", In Proceedings of 12th Conference of the European Chapter of the Association for Computational Linguistics, Mar. 30, 2009, 9 pages.
Irmak, et al., "A Scalable Machine-Learning Approach for Semi-Structured Named Entity Recognition", In Proceedings of 19th International Conference on World Wide Web, Apr. 26, 2010, 10 pages.
Ni, et al., "Cross Lingual Text Classification by Mining Multilingual Topics from Wikipedia", In Proceedings of 4th ACM International Conference on Web Search and Data Mining, Feb. 9, 2011, 10 pages.
Yarowsky, et al., "Inducing Multilingual Text Analysis Tools via Robust Projection Across Aligned Corpora", In Proceedings of the First International Conference on Human Language Technology Research, Mar. 18, 2001, 8 pages.
Feng, et al., "A New Approach for English-Chinese Named Entity Alignment", In Proceedings of the Conference on Empirical Methods in Natural Language Processing, Jul. 2004, 8 pages.
Kim, et al., "Multilingual Named Entity Recognition Using Parallel Data and Metadata from Wikipedia", In Proceedings of the Association for Computational Linguistics, Jul. 10, 2012, 9 pages.

* cited by examiner

NAMED ENTITY RECOGNITION

BACKGROUND

A named entity, such as a person, place, object or other named entity may be a member of a class or type. For example, a person called "John Wayne" may be an example of the class "person". For example, a place called "Mexico City" may be an example of the class "city". Automated systems for recognizing named entities are able to extract named entities from digital documents and classify those named entity mentions into one or more pre-specified categories such as person, city, automobile, and others. Named entity results may then be used for many downstream purposes such as improving information retrieval systems, knowledge extraction systems and many others.

There is an ongoing need to improve the accuracy of existing automated systems for recognizing named entities. Also, many existing named entity recognition systems operate in English but not in other languages. There is a need to scale up named entity recognition systems to operate in many different human languages. The number of different possible classes or types which are possible in existing named entity recognition systems is limited. This restricts the use of the systems to certain classes of named entities. There is a need to scale up named entity recognition systems to recognize larger numbers of classes of named entity. Moreover, the scaling process requires training data, which is usually created manually and hence becomes a costly and time-consuming task.

The embodiments described below are not limited to implementations which solve any or all of the disadvantages of existing named entity recognition systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Named entity recognition is described, for example, to detect an instance of a named entity in a web page and classify the named entity as being an organization or other predefined class. In various examples, named entity recognition results are used to improve information retrieval. In various examples, named entity recognition results are used to augment text from which the named entity was recognized; the augmentation may comprise information retrieval results about the named entity class. In various embodiments labeled training sentences in many different languages are obtained to train machine learning components of a multi-lingual named entity recognition system. In examples, labeled training sentences are obtained from at least two sources, a first source using one or both of a monolingual and a multi-lingual corpus of inter-linked documents and a second source using parallel data, such as that used to train machine translation systems. In examples, labeled training sentences from the two sources are selectively sampled for training the named entity recognition system.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
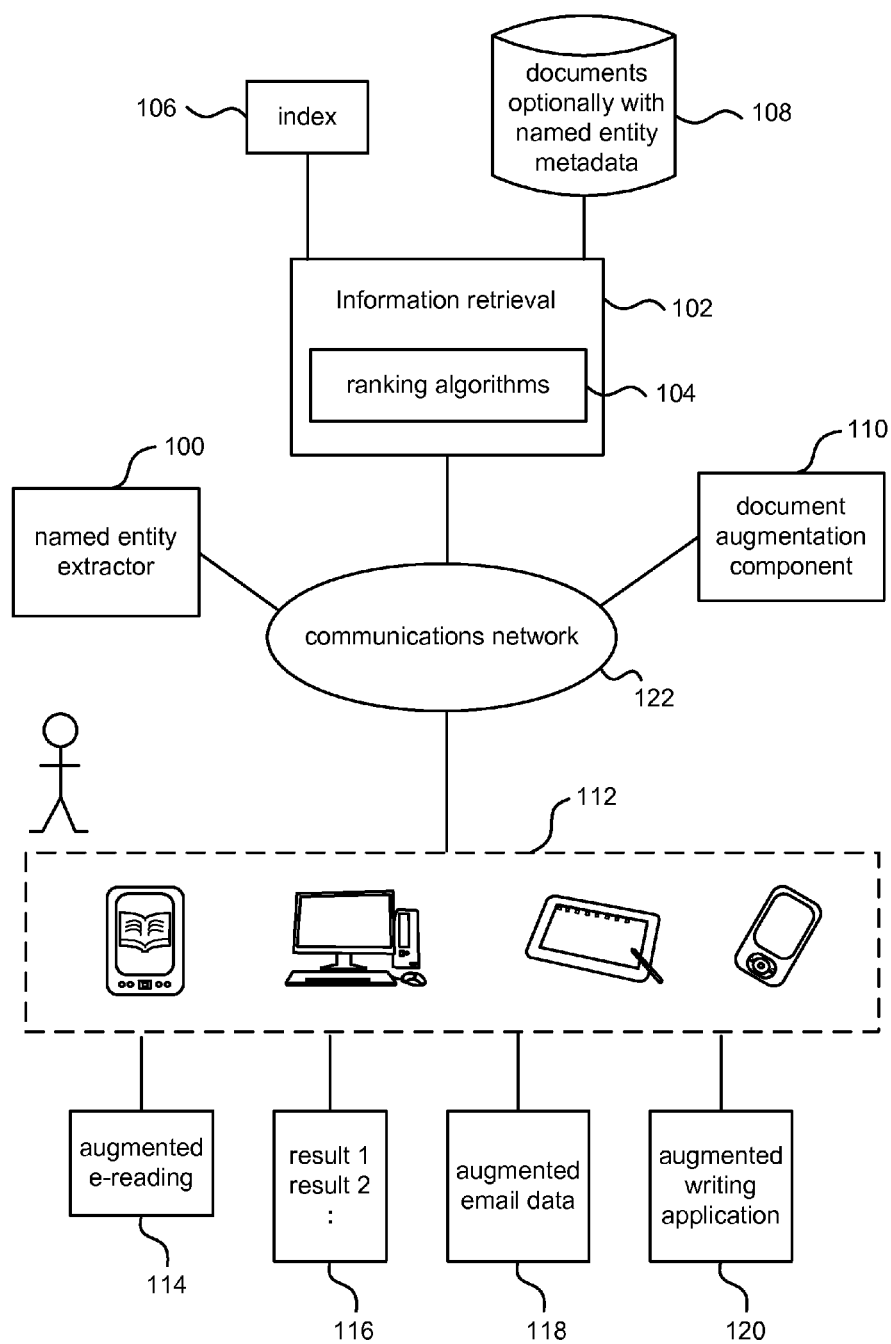
FIG. 1 is a schematic diagram of a named entity extractor for enabling augmentation of text at end user equipment such as e-readers, personal computers, tablet computers and smart phones.

FIG. 1 is a schematic diagram of a named entity extractor 100 for enabling augmentation of text at end user equipment 112 such as e-readers, personal computers, tablet computers, smart phones and other end user equipment. In this example the named entity extractor 100 is available to the end user equipment as a remote service over a communications network 122 such as the internet, an intranet, or any type of wired and/or wireless communications network. It is also possible for the named entity extractor 100 to be implemented, in whole or in part, at the end user equipment. An example in which the named entity extractor is integrated in end user equipment is described below with reference to FIG. 2. The named entity extractor 100 takes text as input (see 300 of FIG. 3) and labels words and phrases in the text with class labels 304. The class labels indicate named entity classes and a class for words and phrases which do not denote named entities and/or which are of unknown class. The class labels may have associated uncertainty information.

The named entity extractor 100 may be used in conjunction with a document augmentation component 110. This component uses the named entity extractor output to retrieve information. The document augmentation component 110 makes the retrieved information available to end user equipment to augment a document and provide insight to an end user. A document is any text item. A non-exhaustive list of examples of documents is: email, blog, search query, letter, memo, report, web page, book, social media post or comment, tweet.

In an example, an end user at his personal computer is using a document viewing application to read a document about financial performance of a number of businesses. The named entity extractor 100 detects named entities in the document text with the class "business organization". The document augmentation component 110 retrieves information about the particular named entities found, on the basis that these are business organizations. For example, the document augmentation component 110 generates a query using the detected named entity and the business organization class. The document augmentation component 110 uses the query to retrieve search results from an information retrieval system 102.

The end user equipment displays the retrieved information at the end user equipment. This may be achieved by sending the retrieved information from the document augmentation component 110 to the document viewing application. The document viewing application may display the retrieved information inline with the document, for example, as pop up displays over the document, as a side bar or in other ways. The end user does not need to move out of the document reading application in order to view the retrieved information (or to retrieve it himself). In other examples, the retrieved information is displayed by an operating system of the end user equipment so that it overlays the document reading application display. Any other suitable ways of presenting the retrieved information may be used.

In this way an end user benefits from augmented text and insights. For example, with augmented e-reading 114, augmented emails 118, augmented authoring applications 120. In the case of augmented authoring applications, the named entity extractor 100 extracts named entities from text input by an end user. The document augmentation component 110 retrieves information about the extracted named entities. The retrieved information is then made available to the end user to facilitate and enrich his or her authoring.

The document augmentation component 110 may be in communication with the end user equipment 112 over a communications network 122. It is also possible for the document augmentation component to be part of the end user equipment.

In some examples an improved information retrieval system is formed by using the named entity extractor 100 and document augmentation component 110. Documents located by a web crawler are analyzed by the named entity extractor 100. The named entity extractor results are stored as metadata 108 associated with the documents. The metadata is then taken into account by an information retrieval system 102 when it creates an index 106 of the documents and/or by ranking algorithms 104 used by the information retrieval system 102. In this way improved quality results 116 are obtained when a query is issued to the information retrieval system.

Figure 2:
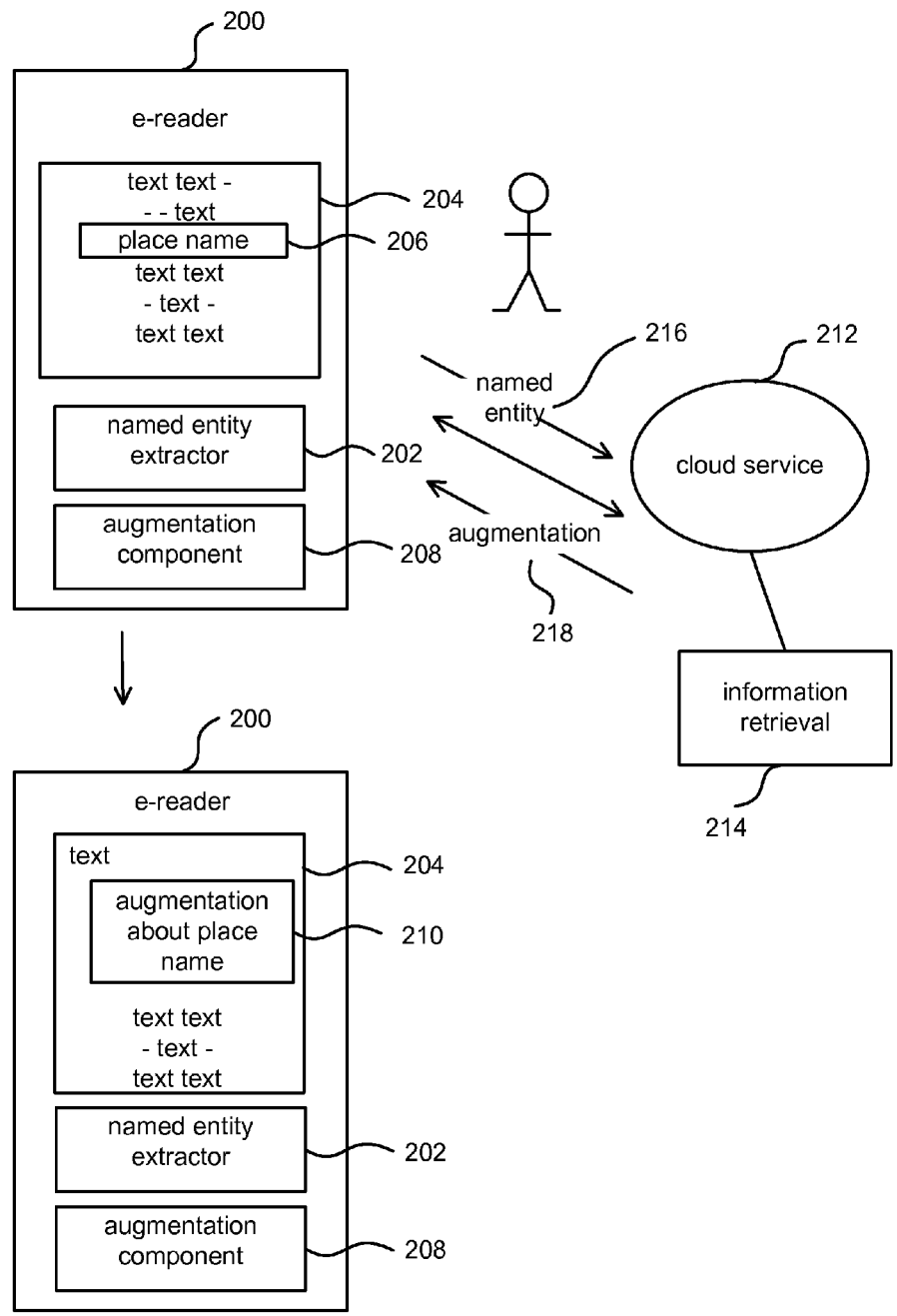
FIG. 2 is a schematic diagram of an e-reader device having a named entity extractor and an augmentation component.

FIG. 2 is a schematic diagram of an e-reader device 200 having a named entity extractor 202 and an augmentation component 208 both integral with the e-reader device 200. An end user operates the e-reader device to read a document 204. The named entity extractor 202 processes text in the document and extracts named entities. In this example a place name 206 is extracted. The augmentation component 208 sends the named entity 216 to a cloud service 212 over a communications network of any type. The information sent to the cloud service may comprise the particular place name, the class label, parts of surrounding text or other context in which the place name appeared and optionally uncertainty information. The cloud service 212 generates one or more queries using the received information and issues the queries to an information retrieval system 214. The cloud service sends augmentation 218 information to the e-reader 200 using results from the information retrieval system 214.

The augmentation component 208 receives the augmentation 218 information and displays augmentation about the place name 210 over the displayed document 204.

The named entity extractor 100, 202, document augmentation component 110, 208 and information retrieval system 102, 214 are computer-implemented using software and/or hardware. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 3:
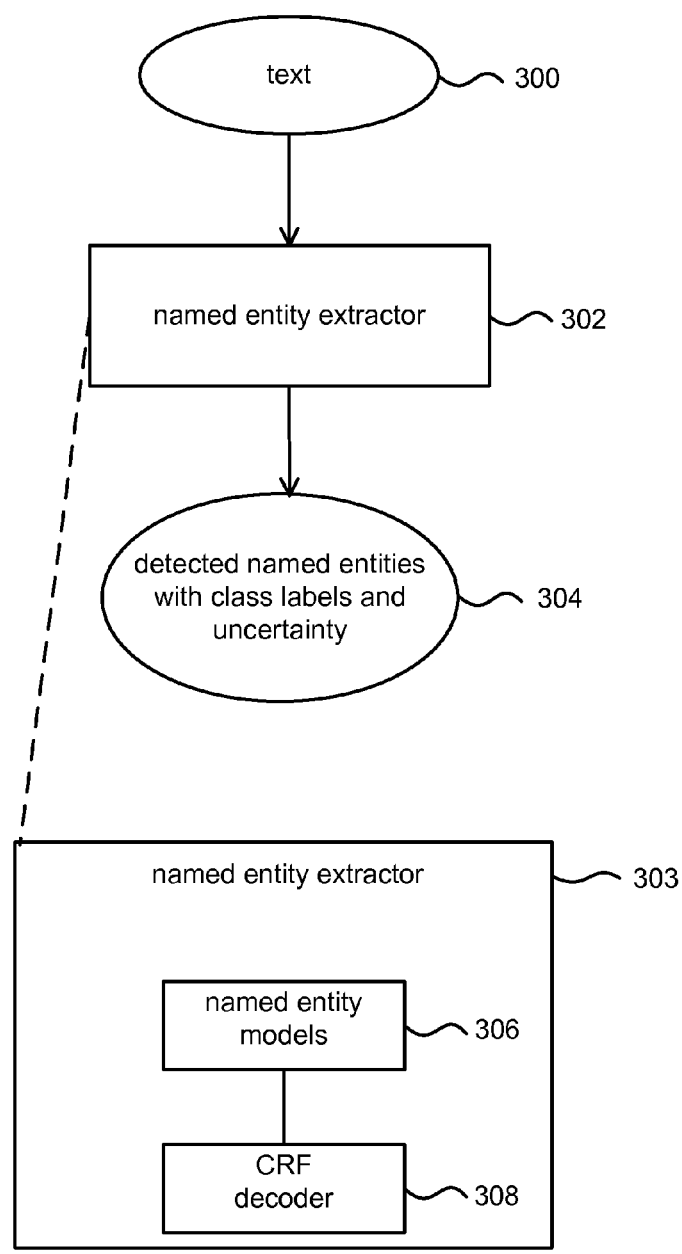
FIG. 3 is a schematic diagram of a named entity extractor in more detail.

FIG. 3 is a schematic diagram of a named entity extractor 302, such as that of FIGS. 1 and 2, in more detail. The named entity extractor 302 is a machine learning component which is trained to label sequences of words and phrases. The labels indicate named entity classes as mentioned above.

The named entity extractor 302 itself may comprise one or more named entity models 306 and a conditional random field decoder 308. These are examples of machine learning components which may be used. However, other types of machine learning techniques may be used; it is not essential to use conditional random field components.

In the case that conditional random field components are used, the named entity models may represent words and phrases using nodes of a graphical representation comprising nodes linked by edges. A conditional random field is a statistical model which, in the examples described in this document, learns the possible patterns in which a named entity may appear based on observations of the named entity in the training data. Such patterns are then represented using a set of predefined features such as one or more words previous to the named entity, one or more words next to the named entity, the leading and trailing three characters of the named entity, and many other possible features. For each one of the possible named entity labels, the model learns the weights of each of the pre-identified features, and associates that weight with that feature for that specific named entity label. Moreover, the model also learns the transition probability which is the likelihood that two arbitrary named entity labels come adjacent to each other. Using these weights (also called emission probabilities) and the transition probabilities, the decoder at runtime computes for each word in the input word sequence, a score for each one of the named entity labels. Finally the decoder selects the maximum likelihood path for the whole sequence of the input words.

Figure 4:
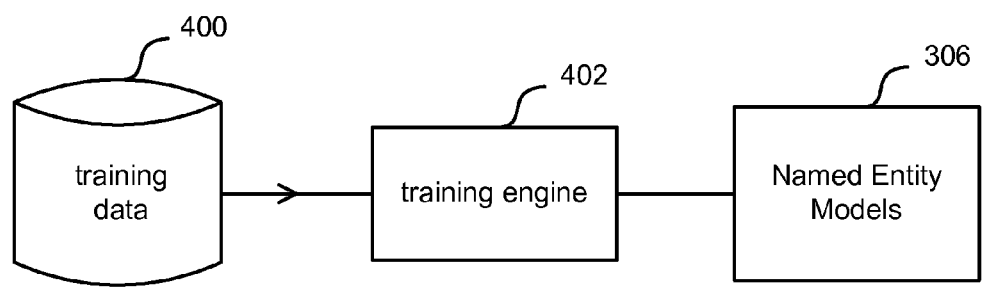
FIG. 4 is a schematic diagram of a training engine for training a named entity extractor.

As mentioned above the named entity extractor is a trained machine learning component. FIG. 4 is a schematic diagram of a training engine 402 for producing a named entity model 306 such as the named entity models of FIG. 3. The training engine 402 takes training data 400 as input. The training data comprises text where sentences are labeled with named entity classes. Previously the training data 400 has been expensive to obtain where it has involved using human judges to label text with named entity classes. Previous automated approaches for obtaining training data 400 have been extremely costly and time-consuming especially when the goal is to scale to a multitude of classes and/or a multitude of languages. The limitations on the cost both financial and time-wise, may limit the size of the training data, which reflects directly on the accuracy of the produced end-to-end named entity recognition system.

The examples described herein use a combination of: a first automated training data generation process and a second automated training data generation process. These approaches are different from one another and together enable a large quantity and variety of sentences with named entity labels to be automatically generated. In addition, both the first and second approaches may produce labeled sentences in different human languages and also target different entity classes. This enables a named entity extractor to be trained for multiple human languages and multiple entity classes.

In various examples a selection process is used to select a subset of the labeled training sentences for use by training engine 402. The selection process may be an informed process as described in more detail below.

By using the combination of two or more different processes for automatically labeling sentences with named entity classes, improved diversity and quantity of training data is gained. For example, an increased range of human languages, increased variety of examples within those human languages, and an increased range of named entity classes. Also, improved quality of training data is achieved due to improvements in the separate processes themselves. As a result improved models 306 and trained named entity extractors 302 are obtained.

Figure 5:
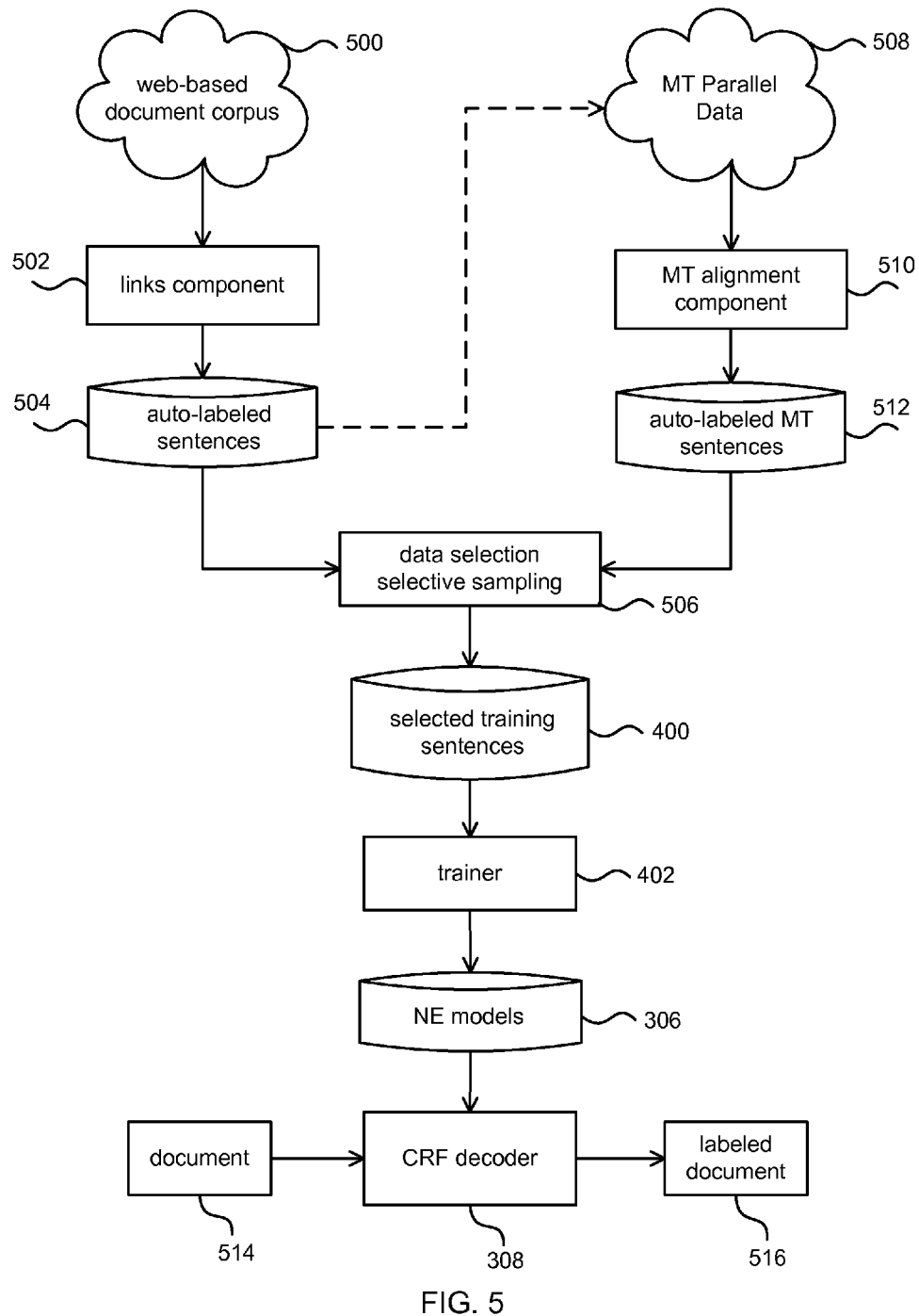
FIG. 5 is a schematic diagram of equipment for generating training data and for training a named entity extractor.

FIG. 5 is a schematic diagram of equipment for automatically generating training data and for training a named entity extractor. A first process for automatically labeling sentences with named entity classes comprises items 500, 502 and 504 of FIG. 5. This process uses a web-based document corpus 500 comprising inter-linked documents and where at least some of the documents are available in more than one language. A hyperlinks-based approach (see links component 502) is used to calculate auto-labeled sentences 504 from the web-based document corpus 500. The links based approach is described in more detail later in this document. It comprises building a semi-supervised classifier to classify web pages of the corpus 500. It uses inter web page links to auto-label sentences and also to scale to multiple languages.

A second process for automatically labeling sentences with named entity classes comprises items 508, 510 and 512 of FIG. 5. Parallel sentences used to train a machine translation system are available. This is shown as MT parallel data 508 in FIG. 5. An alignment based approach (see MT alignment component 510) automatically calculates auto-labeled target language sentences 512 from the MT parallel data 508. The alignment based approach is explained in more detail later in this document. In an example, an English language named entity extractor that was trained with auto-labeled sentences 504 generated from the web-based document corpus (as indicated by the dotted arrow in FIG. 5), is used to label source-side English sentences of the MT parallel data 508. The labels are then projected from the English sentence to foreign target language sentences.

Each of the two approaches may result in millions of labeled sentences. A data selection and selective sampling process 506 is therefore used to select a few hundred thousand labeled sentences. A trainer is used to train named entity models 306 that drives a CRF decoder 308 using the selected training sentences as described above. Once trained, the CRF decoder 308 receives previously unseen documents 514 and produces labeled documents 516.

Figure 6:
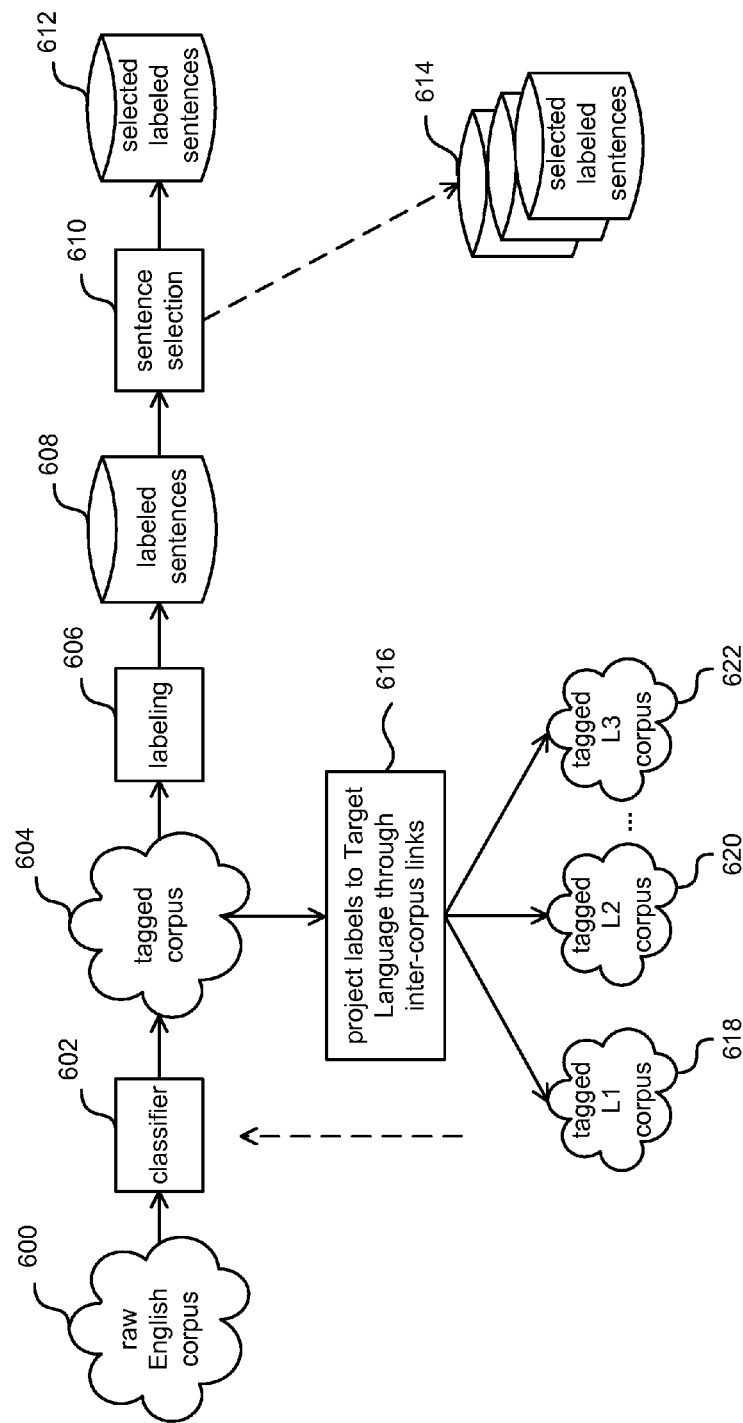
FIG. 6 is a flow diagram of a method of calculating labeled sentences using a corpus of interlinked documents.

More detail about the web-based document corpus process is now given with reference to FIG. 6. Consider a page in a web-based document corpus about the football club "Real Football Club". A paragraphs in that page, contains several hyperlinks to other wiki pages. The name of a football player in the paragraph is hyperlinked to a page with the same title. If the system is able to tag that page as a Person page, then it can inherit that label and use it to tag the anchor text in this paragraph automatically with a Person label. However, in the same paragraph there might be other mentions to people and other classes that are not hyperlinked, and these should be eventually labeled too. These missing non-hyperlinked mentions present a key problem which is at least mitigated using the new methods now described with reference to FIG. 6.

A semi-supervised classifier 602 is used to tag pages of the raw English corpus 600 of the web-based document corpus 500 with the predefined set of entity classes. A non-exhaustive list of examples of classes is: person, place, organization, movies, songs, book titles, . . . etc. Hyperlinks in the document corpus are used to tag anchor text as mentioned above. Different matching techniques may also be used to tag other entity mentions in the web pages. This produces a tagged corpus 604 in a first language.

The tagged pages in the first language are used to project 616 labels to pages in languages other than the first language. This produces tagged language 1 corpus 618, tagged language 2 corpus 620, tagged language 3 corpus 622 and so on for however many languages are being used. The pages in tagged language 1 corpus 618 may be used as seed pages to train a classifier for language 1. This classifier may then be used to tag some or all language 1 pages of the web-based document corpus. This is indicated by the dotted arrow from corpus 618 to classifier 602 in FIG. 6. In the same way classifiers may be built for language 2, language 3 and any other languages being used.

The tagged language 1 pages of the web-based document corpus are processed in the process of FIG. 6 in the same way as the tagged English pages. This comprises page labeling 606 and sentence selection 610. Labeling 606 is described in detail with reference to FIG. 8. Sentence selection is described in more detail later in this document. The sentence selection process produces selected labeled sentences 612, 614 in multiple languages. These may then be used for training one or more named entity extractors as described above.

Figure 7:
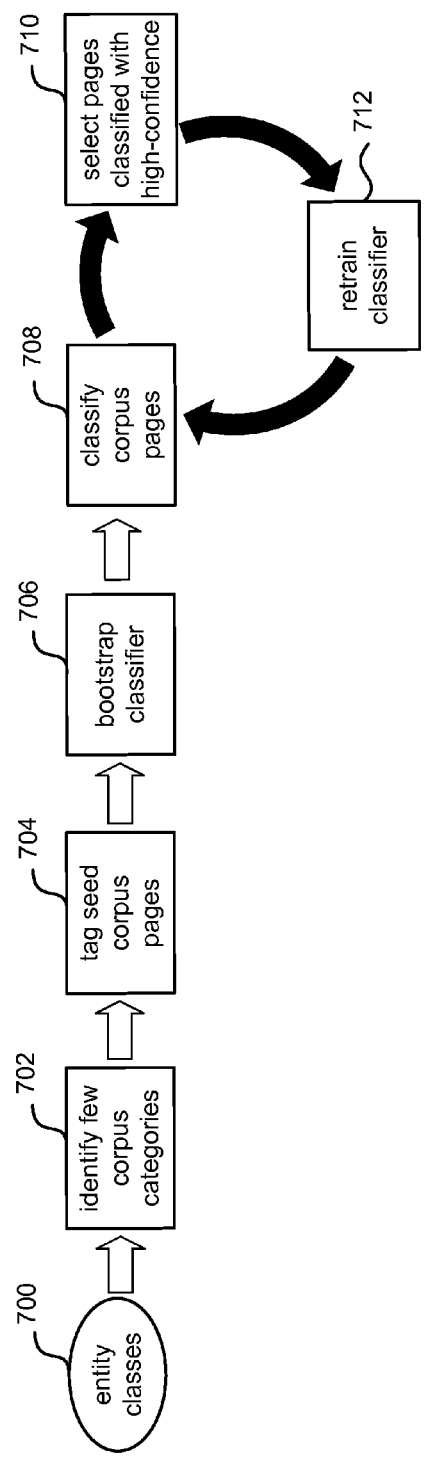
FIG. 7 is a flow diagram of a method of training a classifier for use in the method of FIG. 6.

More detail about the classifier 602 of FIG. 6 is now given. In an example, the classifier is a basic naïve Bayes multi-class classifier that can scale to multiple classes and multiple languages. With reference to FIG. 7, the target entity classes 700 (of the named entity extractor) are pre-specified. For example, these may be: person, location, organization, movie, music, books, miscellaneous entity class, disambiguation class, non-entity class.

One or more rules are used to identify 702 relevant subject categories of the web-based document corpus. For example, the web-based document corpus already has its own subject categories that it associated with web pages. For example, if the web page is about a "location" one or more pre-specified rules may identify categories of the web-based document corpus which are related to the named entity class. For example, "cities in Europe", or "Rivers in Africa", or "villages in Argentina". Then the system tags the pages associated with these categories as location pages. The tagged seed pages 704 are used to bootstrap an initial classifier 706 that is used to classify the remainder of the web-based document corpus 708. Then the process selects those pages that were classified with high confidence 710 and uses them to augment the original training data. Retraining 712 is carried out. The process uses several iterations until the gain becomes negligible.

In an example the classifier 602 of FIG. 6 is a basic naïve Bayes multi-class classifier that uses a weighted log-linear combination of features. For example it may use a numerical statistic called term frequency-inverse document frequency (TFIDF) which indicates how important a word is to a document in a collection of documents.

Figure 8:
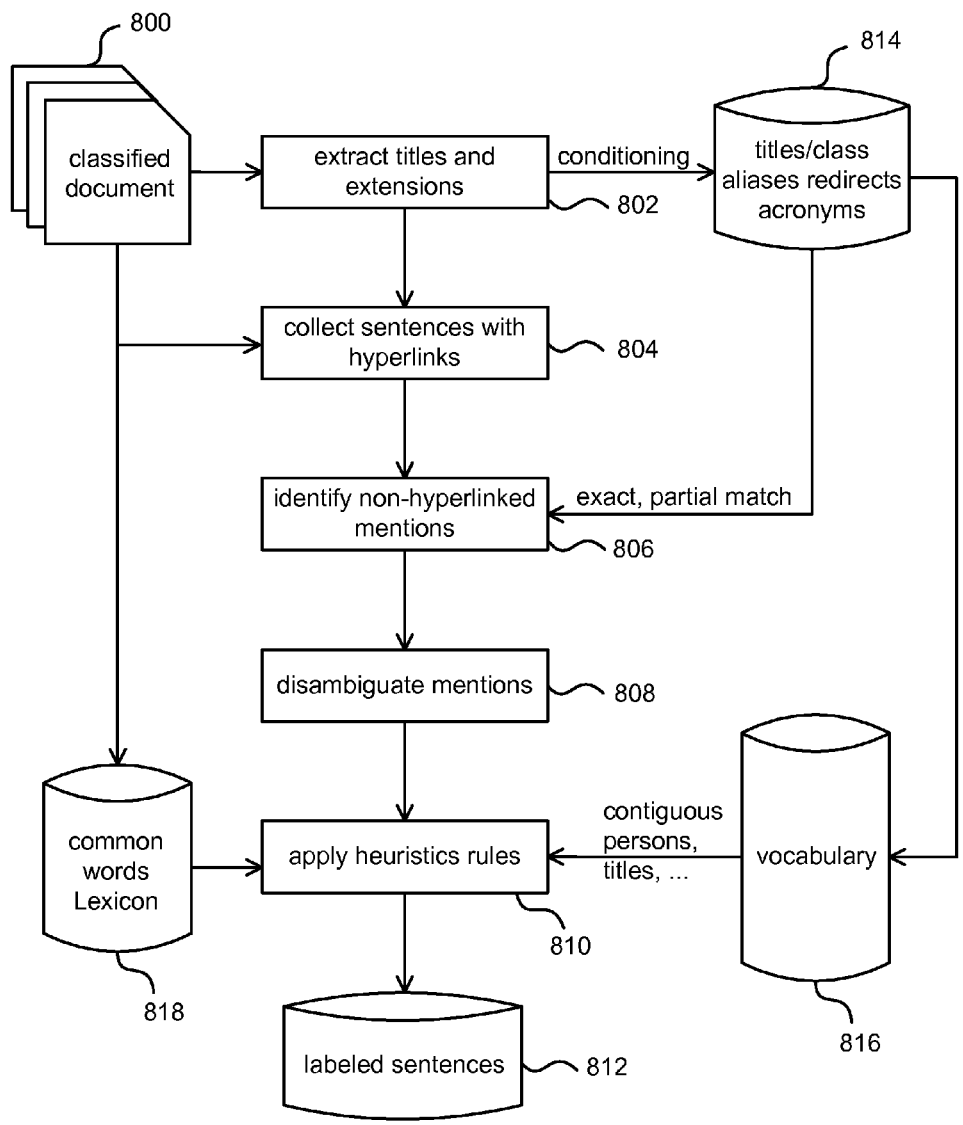
FIG. 8 is a flow diagram of a method of labeling sentences for use in the method of FIG. 6.

FIG. 8 is a flow diagram of a method of labeling sentences for use in the method of FIG. 6. Starting from the classified documents 800 (e.g. web pages), an automated process extracts 802 from the documents a list of titles 814 along with their extensions, such as aliases, acronyms, redirects, and classes.

The labeling process collects 804 sentences having hyperlinks to labeled pages. The labeling process identifies 806 those mentions in the sentences that are not hyperlinked, and through different matching strategies with the help of the title lists, decides whether to label these mentions and with which classes.

While labeling sentences, the labeling process disambiguates 808 ambiguous mentions that refer to multiple classes, using in-context and out-of-context disambiguation. At the end, heuristics rules are applied 810. One example of a heuristic rule is to capture and label person names through contiguous single-tokens relying on the person vocabulary 816 generated from the title lists, and undoing doubtful labels based on a common words lexicon 818 generated automatically from the web-based document corpus.

The output of the labeling process is labeled sentences 812.

Figure 9:
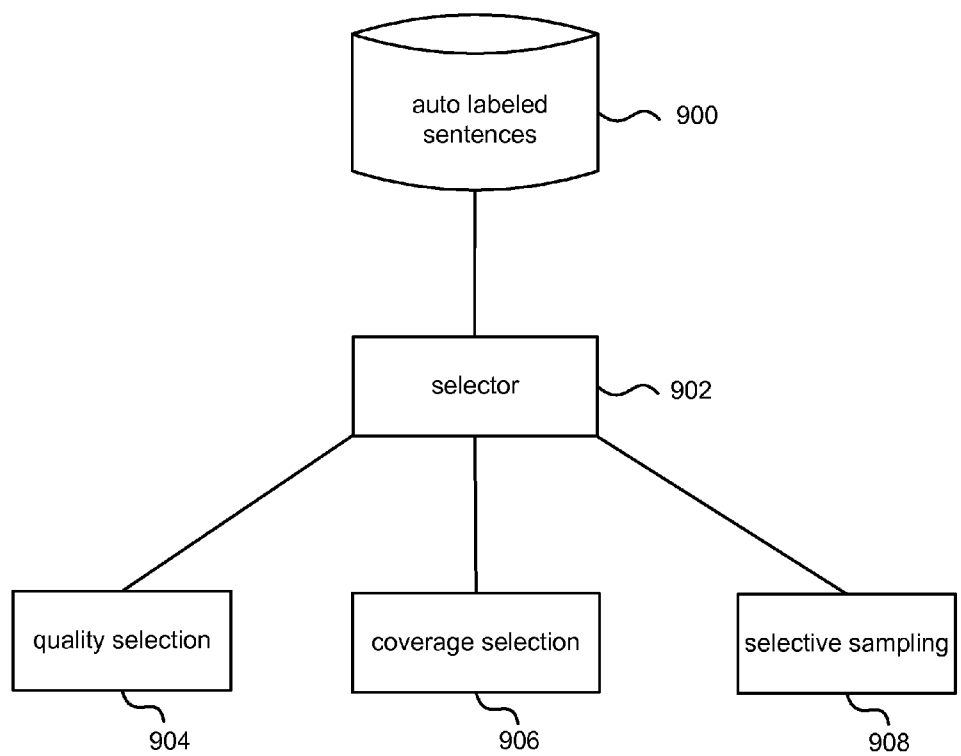
FIG. 9 is a flow diagram of a method of labeled sentence selection for use in the method of FIG. 6.

FIG. 9 is a flow diagram of a method of labeled sentence selection for use in the method of FIG. 6. Auto-labeled sentences 900 are processed by a selector 902 which uses any one or more of quality-based selection 904, coverage-based selection 906 and selective sampling (active learning) 908. Quality selection 904 may comprise selecting labelled sentences based on the quality of the labels, assuming that hyperlink labels have the highest quality, followed by exact match labels, then sub-name match and so forth. Quality selection may comprise dismissing sentences with lots of unlabelled capitalized words.

Coverage selection 906 may comprise extracting sentences occurring in a specified location within a document. For example, the first 2 paragraphs of a document, may be where usually the mentions are first cited and hyperlinked.

Coverage selection 906 may comprise favouring diversity and frequency of single-token labels. A single-token label is a single word with a named entity label. This selection criteria has been found particularly beneficial.

Figure 10:
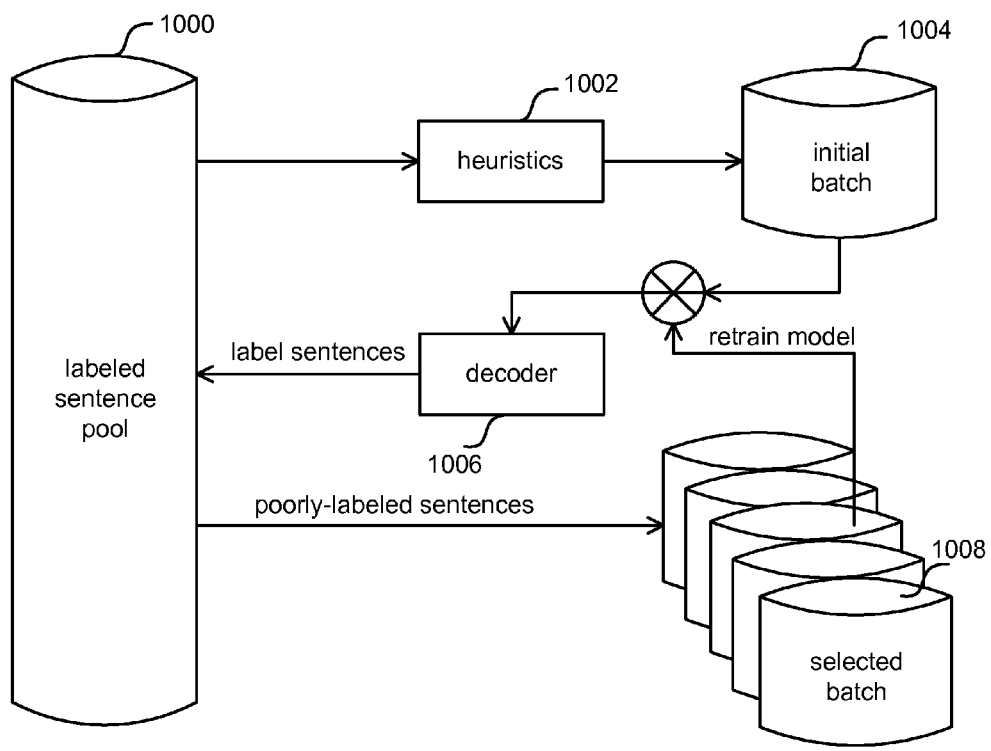
FIG. 10 is a flow diagram of a method of selective sampling for use in the method of FIG. 9.

Selective sampling 908 may also be used and has been found to give very good improvements. Selective sampling is now described with reference to FIG. 10. Selective sampling is similar to active learning which comprises assessing where performance of a trained named entity extractor is weak. This may be done for example, by comparing uncertainty information of output of the named entity extractor with one or more references. Once areas of weak performance are identified an active learning process seeks out training data which will address the weak performance.

Starting from the initial pool of auto-labeled sentences 1000, a selective sampling process selects (at random or in other ways) an initial batch 1004 of labeled sentences based on coverage heuristics 1002 as previously mentioned. Because this initial batch is selected only using coverage heuristics and random selection, it may not be suitable for training a robust named entity extractor. In this example, the named entity extractor is depicted as decoder 1006 such as CRF decoder 308 of FIG. 3. The process of FIG. 10 repeatedly retrains the decoder 1006 by incrementally augmenting the training data with batches 1008 selected from the original pool, where those batches are selected using repeatedly updated information about performance of the decoder 1006.

To select the labeled sentences in the selected batches 1008, the most informative sentences are selected based on a confidence score produced by the decoder. A process may select sentences where the confidence level of the decoder 1006 in disagreeing labels is low. As this is an indication that the original label is probably correct, and that it's a pattern that the model needs to learn.

In an example, sentences with an average confidence score lower than a certain threshold are considered as good candidates and are selected in the next iteration. An example of a suitable confidence score is:

$$\text{Conf}(S)=\text{Average}_{C_j=L_j}^{n}(P(C_j|t_j))$$

Where: Conf(S) is the confidence that the decoder 1006 gave to a sentence S; n is the number of tokens in S; $C_j$ is the predicted class label for the $j^{th}$ token from the decoder; $L_j$ is the original label in the training data; $P(C_j|t_j)$ is the probability (confidence score) that was assigned by the decoder to the class label $C_j$ for the $j^{th}$ token.

Figure 11:
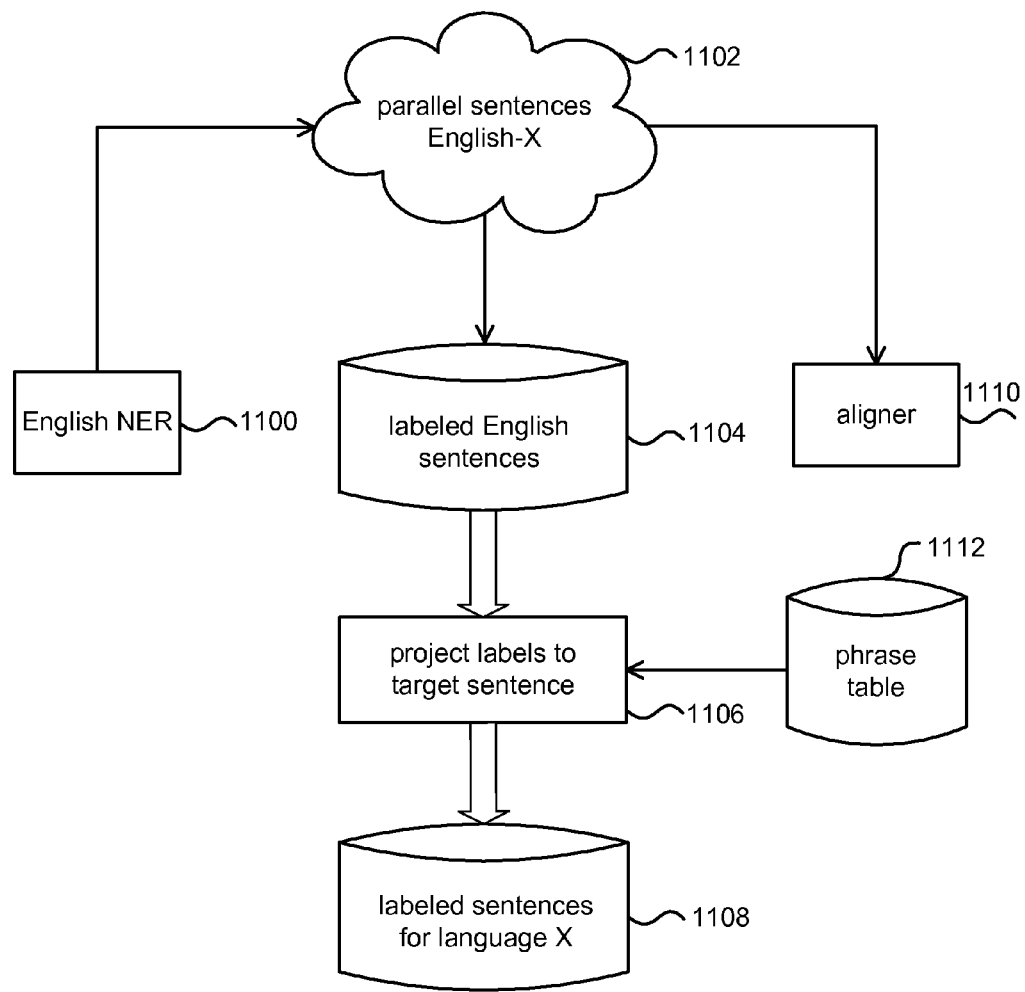
FIG. 11 is a schematic diagram of a process for generating labeled sentences from parallel data used to train machine translation systems.

FIG. 11 is a schematic diagram of a process for generating labeled sentences from parallel training data used, among others, to train machine translation systems. This alignment-based sentence labeling process may be used as part of the process of FIG. 5.

Parallel sentences 1102 may comprise pairs of sentences with the same semantic meaning where one sentence is in a source language (e.g. English) and another sentence is in a target language (e.g. Arabic). In the example of FIG. 11 the source language is English. However, this is an example only. Other source languages may be used.

Starting from the parallel sentences 1102 used to train a machine translation (MT) system, a sentence labeling process labels the English sentences 1104 using a named entity extractor 1100 trained using a web-based document corpus process such as that of FIG. 5. Then using automatic alignment, the process projects 1106 the labels from the source language (e.g. English) sentence to the target language sentence. The target language labels may be collected from a phrase table 1112 which is generated through the alignment process 1110. This produces labeled sentences for language X (the target language). The method of FIG. 11 may be repeated for several target languages.

In an example, the process retains only sentences for which labels have been aligned contiguously in the target language.

The final selection may promote those target sentences for which all English labels have been projected, and where the original English labels had high confidence scores and high alignment scores.

In an example, sentences are scored and only sentences with a score higher than a certain threshold are selected. The score of a sentence may be considered the minimum score of its tokens.

Figure 12:
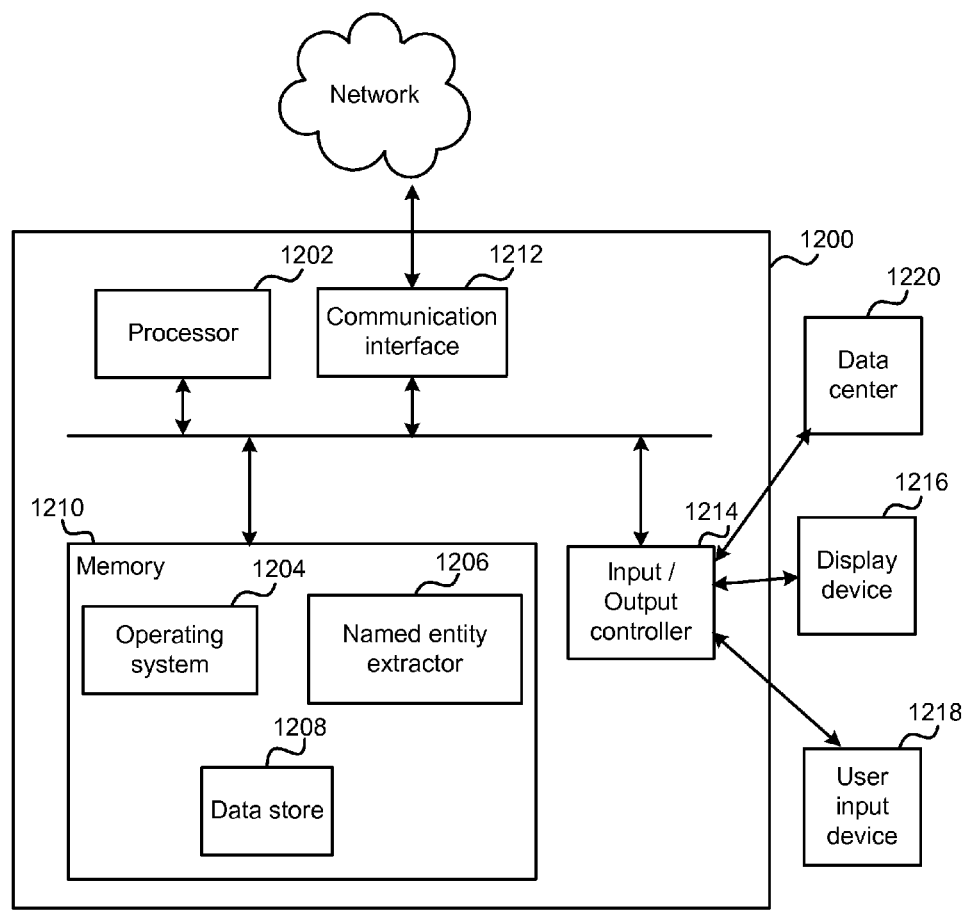
FIG. 12 illustrates an exemplary computing-based device in which embodiments of named entity recognition for information retrieval and/or text augmentation may be implemented.

FIG. 12 illustrates various components of an exemplary computing-based device 1200 which may be implemented as any form of a computing and/or electronic device, and in which embodiments of a named entity extractor may be implemented.

Computing-based device 1200 comprises one or more processors 1202 which may be microprocessors, controllers or any other suitable type of processors for processing computer executable instructions to control the operation of the device in order to control training of a named entity extractor, creation of training data for training a named entity extractor, use of a trained named entity extractor at test time. In some examples, for example where a system on a chip architecture is used, the processors 1202 may include one or more fixed function blocks (also referred to as accelerators) which implement a part of the method of allocating queries to servers in hardware (rather than software or firmware). Platform software comprising an operating system 1204 or any other suitable platform software may be provided at the computing-based device to enable application software to be executed on the device. For example, named entity extractor 1206 enables text to be labeled with named entity classes. A data store 1208 at memory 1210 may store training data, classifiers, documents, criteria, thresholds, rules and other data.

The computer executable instructions may be provided using any computer-readable media that is accessible by computing based device 1200. Computer-readable media may include, for example, computer storage media such as memory 1210 and communications media. Computer storage media, such as memory 1210, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1210) is shown within the computing-based device 1200 it will be appreciated that the storage may be distributed or located remotely and accessed via a network or other communication link (e.g. using communication interface 1212). Communication interface 1212 enables the computing-based device 1200 to communicate with data sources such as data streams which are available over a communications network. Communication interface 1212 also enables the computing-based device 1200 to receive queries from end user equipment either directly or via intermediate systems and to send outputs of the query executions to those entities.

The computing-based device 1200 also comprises an input/output controller 1214. The input/output controller 1214 may output display information to a display device 1216 which may be separate from or integral to the computing-based device 1200. The display information may provide a graphical user interface, for example, to enable a human operator to view named entity extraction results. The input/output controller 1214 may be arranged to receive and process input from one or more devices, such as a user input device 1218 (e.g. a mouse, keyboard, camera, microphone or other sensor). In some examples the user input device 1218 may detect voice input, user gestures or other user actions and may provide a natural user interface (NUI). This user input may be used to set thresholds, specify rules, specify document sources and for other purposes. In an embodiment the display device 1216 may also act as the user input device 1218 if it is a touch sensitive display device. The input/output controller 1214 may also output data to devices other than the display device, e.g. a locally connected printing device.

Any of the input/output controller 1214, display device 1216 and the user input device 1218 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
    labeling text items in a first set of text, in a first language, from a multi-lingual digital document corpus, with first labels indicating first named entity classes by inheriting respective class labels of corresponding documents in the corpus into anchors in the first set of text which hyperlink the corresponding documents;
    generating respective confidence scores for the text items in the first set of text labeled with the named entity classes, the confidence scores including weights based on features of the labeled text items and transition probabilities among respective ones of the labeled text items;
    applying heuristic rules to remove labels having confidence scores lower than the confidence scores of other labeled text items from the first set of text;
    automatically labeling text items in a second set of text of a second language from the multi-lingual digital document corpus, from parallel sentences in the first set of text, the text items in the second set of text being labeled with second labels indicating second named entity classes, the parallel sentences being pairs of sentences with a same semantic meaning in the first and second languages;
    selecting a subset of the parallel sentences including labeled text from the first and second sets of text, wherein, for the selected parallel sentences, the text items having disagreeing labels with lower confidence scores than the text items having agreeing labels and wherein the subset comprises fewer than a total number of the parallel sentences of the first set of labeled text and the second set of labeled text;
    using the selected subset of the parallel sentences to train a machine learning component; and
    using the trained machine learning component to label a third set of text, in a language of the multi-lingual document corpus, with one or more of the first labels or the second labels.

2. The method of claim 1, comprising selecting the subset based at least in part on coverage criteria related to diversity of the first set of labeled text and the second set of labeled text.

3. The method of claim 1, wherein selecting the subset comprises selecting the subset to increase diversity and frequencies of single-token labels within the subset, and wherein the single-token labels comprise individual words with corresponding named entity class labels.

4. The method of claim 1, further comprising:
    using the trained machine learning component to label the third set of text and calculate the confidence scores associated with the one or more of the first labels or the second labels; and
    selecting the subset of text items having higher confidence scores than other text items.

5. The method of claim 1, further comprising:
    automatically labeling the second set of text from the parallel sentences for each pair of sentences by projecting the second labels indicating the second named entity classes in a source language sentence of the pair of sentences to a parallel target language sentence of the pair of sentences; and selecting one or more target language sentences where corresponding projected labels are contiguous in a target language.

6. The method of claim 1, further comprising:
automatically labeling the second set of text from the parallel sentences for each pair of sentences by projecting the second labels indicating the second named entity classes in a source language sentence of the pair of sentences to a parallel target language sentence of the pair of sentences; and
selecting one or more target language sentences where all labels from a source language were successfully projected.

7. The method of claim 1, further comprising:
automatically labeling the second set of text from the parallel sentences for each pair of sentences by projecting the second labels, with confidence levels above a threshold, indicating a minimum confidence in projecting the second named entity classes in a source language sentence of the pair of sentences to a parallel target language sentence of the pair of sentences.

8. The method of claim 1, wherein labeling the first set of text in the first language from the multi-lingual document corpus comprises classifying a plurality of documents of the document corpus into entity classes using at least one multi-class classifier having been bootstrapped using seed documents and iteratively trained, the seed documents being documents labeled with pre-specified entity classes.

9. The method of claim 8, further comprising using a plurality of multi-class classifiers to classify different language documents of the multi-lingual document corpus.

10. The method of claim 8, further comprising labeling respective text of the plurality of documents by collecting one or more sentences with hyperlinks to documents classified into one or more entity classes.

11. The method of claim 8, further comprising labeling respective text of the plurality of documents by identifying named entity mentions which are not hyperlinked and classifying the identified mentions using any one or more of: title lists, aliases, redirects, or acronyms.

12. The method of claim 8, further comprising labeling respective text of the plurality of documents by disambiguating ambiguous named entity examples that refer to multiple named entity classes.

13. The method of claim 8, further comprising labeling respective text of the plurality of documents by labeling person names using a vocabulary generated from titles of categorized documents.

14. The method of claim 8, wherein applying the heuristic rules includes labeling respective text of the plurality of documents by removing uncertain labels that are identified based at least in part on a common words lexicon.

15. A computer-implemented method comprising:
labeling text items in a first set of text, in a source language from a multi-lingual document corpus, with first labels indicating first named entity classes by inheriting respective class labels of corresponding documents in the corpus into anchors in the first set of text which hyperlink the corresponding documents;
generating respective confidence scores for the text items in the first set of text labeled with the named entity classes, the confidence scores including weights based on features of the labeled text items and transition probabilities among respective ones of the labeled text items;
applying heuristic rules to remove labels having confidence scores lower than confidence scores of other labeled text items from the first set of text;
automatically labeling text items a second set of text of a parallel target language from the multi-lingual digital document corpus, from parallel sentences in the first set of text, the text items in the second set of text being labeled with second labels indicating second named entity classes by projecting at least one of the first labels indicating a named entity class of the first named entity classes in a source language sentence to a parallel target language sentence, the parallel sentences being pairs of sentences with a same semantic meaning in the source and target languages;
selecting a subset of the second set of labeled text including at least one target language sentence where all labels from a source language were successfully projected wherein, for the selected subset of the second set of labeled text, the text items having disagreeing labels, relative to a the first set of labeled text in the source language, have lower confidence scores than text items having agreeing labels and wherein the subset comprises fewer than a total number of the labeled text items in the second set of labeled text; and
using the selected subset to train a machine learning component; and
using the trained machine learning component to label a third set of text, in a different language of the multi-lingual document corpus, with one or more named entity class labels.

16. A computer-implemented device comprising:
one or more processors;
memory;
a links component stored in the memory and executable by the one or more processors to label text items in a first set of text, in a first language, from a multi-lingual document corpus, with first labels indicating first named entity classes by inheriting respective class labels of corresponding documents in the corpus into anchors in the first set of text which hyperlink the corresponding documents;
a decoder stored in the memory and executable by the one or more processors to generate respective confidence scores for the text items in the first set of text labeled with the named entity classes, the confidence scores including weights based on features of the labeled text items and transition probabilities among respective ones of the labeled text items;
a heuristic component stored in the memory and executable by the one or more processors to apply heuristic rules to the labeled first set of text to remove labels having confidence scores lower than the confidence scores of other labeled text items from the first set of text;
a machine translation alignment component stored in the memory and executable by the one or more processors to label text items in a second set of text of a second language from the multi-lingual document corpus, from parallel sentences in the first set of text, the text items in the second set of text being labeled with second labels indicating second named entity classes, the parallel sentences being pairs of sentences with a same semantic meaning in the first and second languages;
a selector stored in the memory and executable by the one or more processors to select a subset of the parallel sentences including labeled text from the first and second sets of text, wherein, for the selected parallel sentences, the text items corresponding to disagreeing labels have lower confidence scores than text items corresponding to agreeing labels and wherein the subset comprises fewer than a total number of the parallel sentences of the first set of labeled text and the second set of labeled text;

a training engine stored in the memory and executable by the one or more processors to use the selected subset of parallel sentences to train a machine learning component; and the trained machine learning component stored in the memory and executable by the one or more processors to label a third set of text, in a different language of the multi-lingual document corpus, with a plurality of named entity class labels.

17. The computer implemented device of claim 16, wherein the selector selects the subset of text items having higher confidence values associated with a labeled text output by the machine learning component than other labeled text output by the machine learning component.

18. The computer implemented device of claim 16, wherein the links component is at least partially implemented using hardware logic selected from any one or more of: a field-programmable gate array, a program-specific integrated circuit, a program-specific standard product, a system-on-a-chip, a complex programmable logic device, or a graphics processing unit.

* * * * *